Aug. 7, 1928.
R. N. DULANEY
1,679,353
SELECTIVE GEAR SHIFTING MECHANISM
Filed July 14, 1926   3 Sheets-Sheet 2
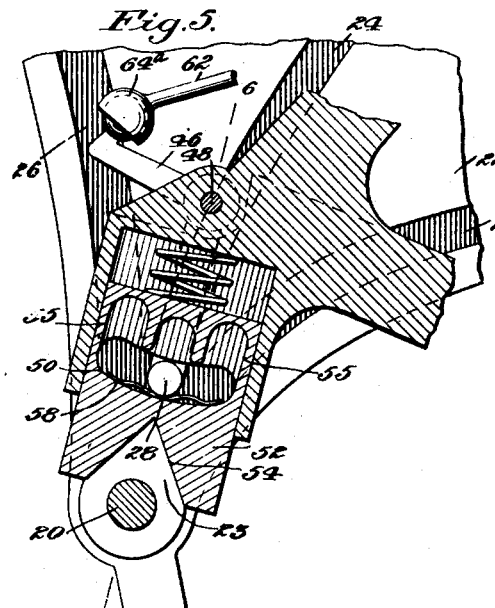
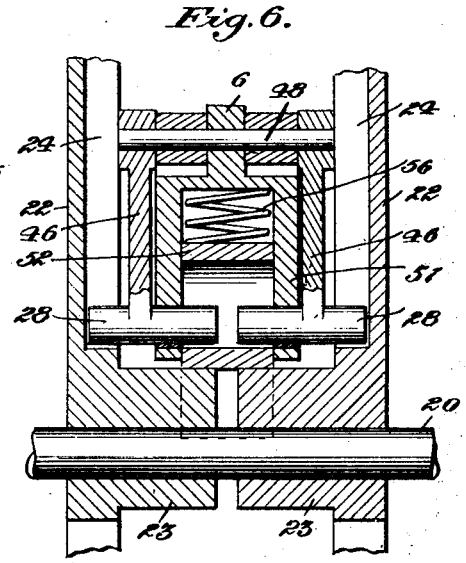
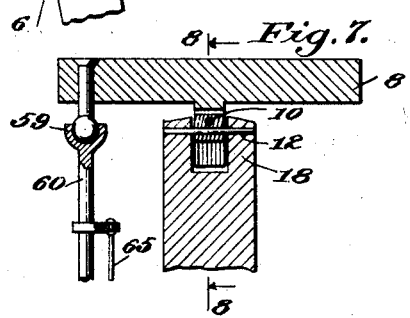
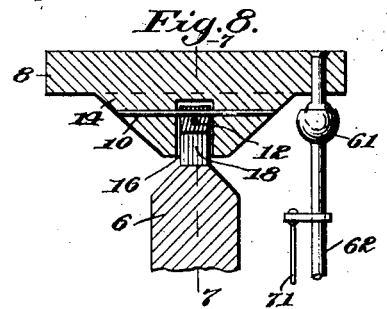
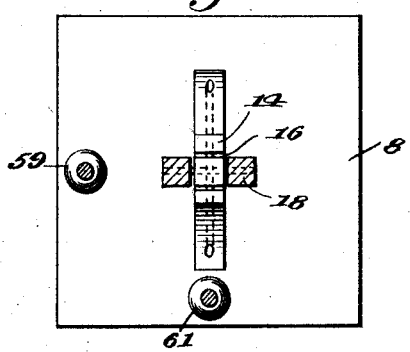
Inventor:
Robert N. Dulaney,
by C. A. Mason, Atty.

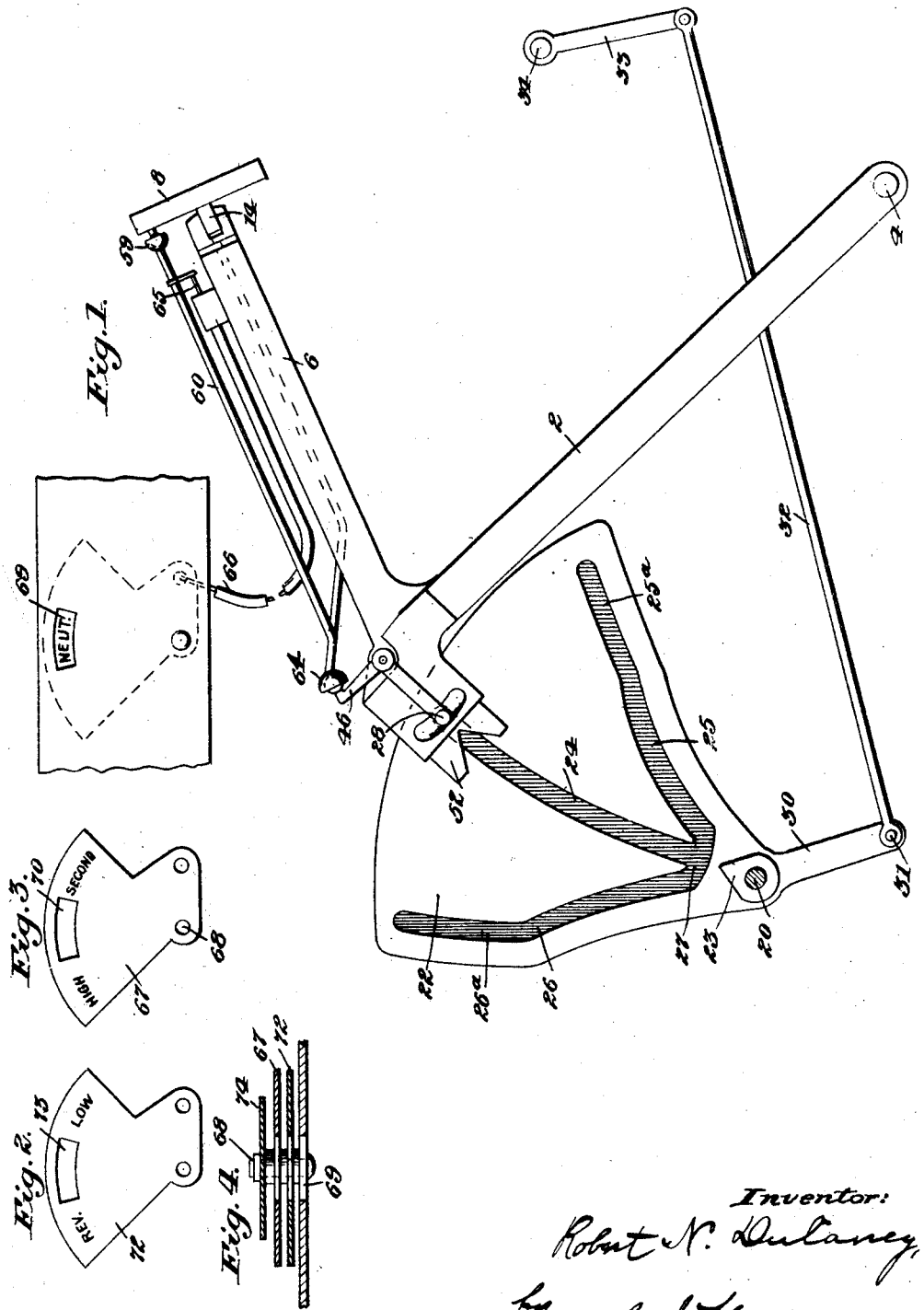

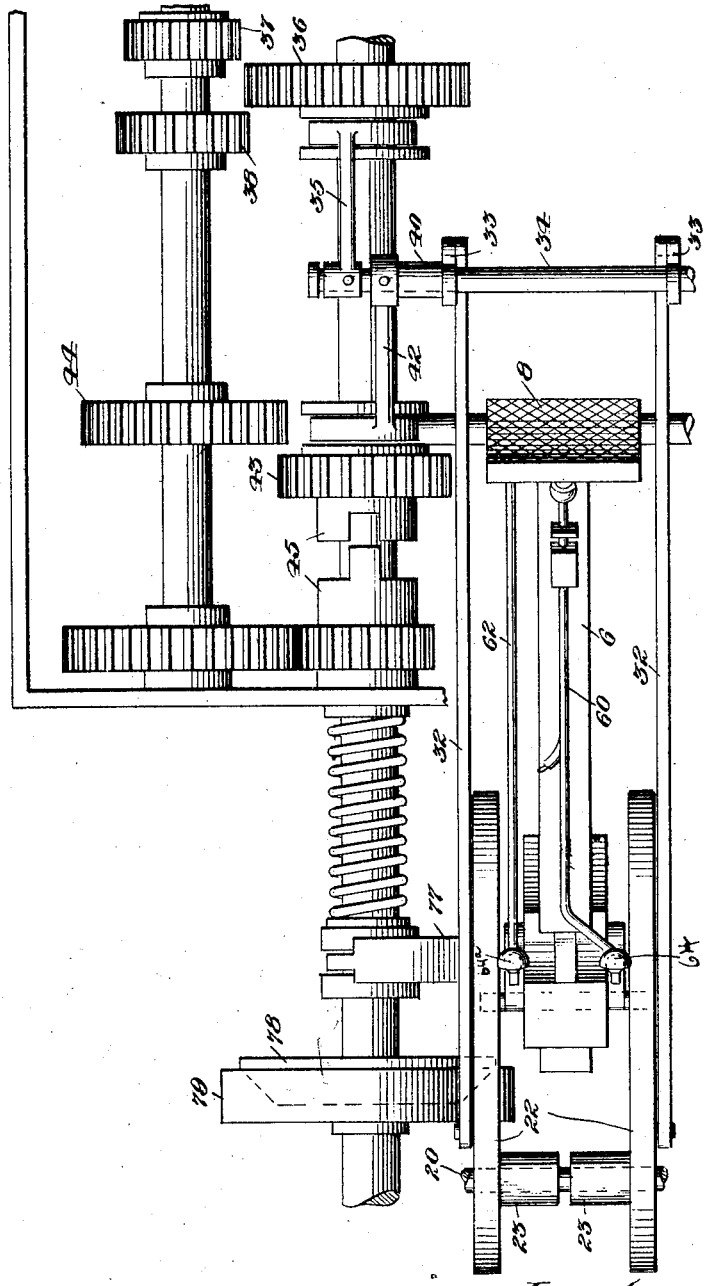

Patented Aug. 7, 1928.

1,679,353

UNITED STATES PATENT OFFICE.

ROBERT N. DULANEY, OF BLOUNTVILLE, TENNESSEE.

SELECTIVE-GEAR-SHIFTING MECHANISM.

Application filed July 14, 1926. Serial No. 122,381.

This invention relates to means for selectively controlling and for shifting the gears constituting the transmission of motor vehicles.

The invention has for an object to provide mechanism whereby the driver of the vehicle may select the gear to be shifted and, by a mere depression of the usual clutch pedal following such selection, cause the shifting of the gears automatically upon release of the clutch pedal. The mechanism is so designed that the possibility of shifting the gears while the clutch is in engagement is prevented without the exercise of any care upon the part of the operator, whereby stripping of the gears is avoided.

An important feature of the invention consists in a selective mechanism for the gears to be shifted which is operated merely by rocking the pedal of the clutch-release lever, and in order to secure the accomplishment of this object the pedal is mounted to turn upon two axes arranged at right angles to each other. Upon a turning movement of the operator's foot, forward or rearward, or to the right or left, the selection of the gear to be shifted is made, following a depression of the clutch lever to disengage the clutch. When the clutch lever is thereafter released to permit engagement of the clutch parts, the position of a selecting member, previously determined by the tilting of the pedal, insures without further thought on the part of the operator the shifting of the proper gear into position to give the desired speed of the vehicle. Mechanism under the control of the clutch lever while said lever is moving into position to cause engagement of the clutch parts, effects the shifting of the gears during a portion of the outward movement of said lever, and permits an engagement of the clutch parts during the remainder of such outward movement. Upon reverse movement of the clutch lever prior to shifting the gears to a different position, the clutch is invariably released in advance of the shift, and thereafter, following the selection of a different gear, the clutch lever is again released and through said mechanism effects said gear shifting, and thereafter permits re-engagement of the clutch parts.

By this invention the usual manually-controlled gear shifting lever is dispensed with, and both the selecting and shifting mechanism for the gears are controlled by the clutch lever and its pedal, thereby simplifying the mechanism commonly in use.

To prevent the possibility of a mistake in shifting the gears, an indicator has connection with the pedal of the clutch lever so that the operator may determine at a glance the condition of the gears, before and after a gear selective movement has been imparted to the pedal.

The foregoing, and other important features and combinations contemplated by the invention will be more apparent from the following description, when considered in connection with the accompanying drawings forming part thereof, and in which—

Figure 1 is a view in side elevation, partly sectional, illustrating a portion of the selecting and shifting mechanism;

Figures 2 and 3 are side elevations of two of the indicator plates;

Figure 4 is a horizontal sectional view of the indicator plates assembled;

Figure 5 is an enlarged, fragmentary view in vertical section showing a portion of one of the cam plates, of the clutch lever and lock;

Figure 6 is a section on line 6—6, Figure 5;

Figure 7 is a transverse section on line 7—7, of Figure 8;

Figure 8 is a section on the line 8—8, Figure 7;

Figure 9 is an inverted plan view of the pedal sectioned through the universal joint which supports said pedal; and Figure 10 is a plan view illustrating the controlling and gear shifting mechanism in connection with a transmission and clutch.

The clutch shifting lever 2 is supported upon its pivot 4 and has the rearwardly extending arm 6, which usually plays through a slot in a portion of the floor-board of an automobile. The usual pedal 8 is connected with the arm 6 by pivots 10, 12, arranged at right angles to each other, the pedal being herein shown as provided with a downwardly extended fin 14, bifurcated by a slot 16, while the upper end of the lever arm 6 has a slotted extension 18 which receives the fin 14. The slots of the extension 18 and fin 14, are, when the pedal is in normal or neutral position, intersecting, that is, the walls of said slots are arranged at right angles. With this arrangement, the pedal is obviously mounted to turn on the arm 6 either forward and rearward or laterally, from side to side, and when tilted either of the two first-named directions, the slot 16 will move out of line with the slot of the extension 18 so that the pedal cannot be tilted laterally at such time. The converse is also true, that is, if the pedal be rocked laterally with respect to the lever arm 6 about the pivot 12, a portion of the fin 14 will enter the slot of the extension 18 of arm 6 and lock the pedal against tilting movement on an axis transverse of the axis defined by the pivot 12.

The described rocking movements of the pedal are transmitted through suitable devices to gear selecting mechanism which, upon release of the clutch lever following the depression thereof, causes the gears to be shifted in accordance with such selection. The devices for accomplishing this result are as follows:

A shaft 20, suitably supported from the frame, pivotally supports, two cam plates 22 which have cam lugs or projections 23 extending inwardly, and formed, as shown, as an inverted V. The plates 22 are provided each with three inwardly facing grooves or slots 24, 25 and 26. The groove 24 is formed on the arc of a circle whose center is at the fulcrum 4 of the clutch lever. The grooves 25, 26, are located equal distances on either side of the grooves 24, and, starting from a transverse connecting groove 27 at the meeting point of the three grooves, each groove 25 and 26 is formed partly as a curve and partly as a straight line, 25$^a$, 26$^a$. The curved portions of these grooves act, through pins 28, to move the plates either backwardly or forwardly from a neutral position as shown in Figure 1, and such movements are instrumental in effecting a shifting of the gears. The plates 22 are provided with downwardly extending arms 30, which are pivoted at 31 to rods 32. These rods are pivotally connected to arms 33. One of said arms 33 is fast to a shaft 34 which may be connected to a gear shifting fork 35 for moving a gear 36 from a neutral position into mesh with a "low" gear 38, or into mesh with a gear connected with a "reverse" gear 37. The other arm 33 is herein shown as connected with a sleeve shaft 40, surrounding the shaft 34, and connected with a fork 42 through which a gear 43 may be caused to mesh with a gear 44 for second speed, or the clutch members 45 may be brought into engagement for "high" speed.

The pins 28 are mounted upon bell crank levers 46 which are fulcrumed at 48 to the arm 6. The pins 28 extend laterally on opposite sides of the lower arms of bell cranks 46, and the inwardly projecting portions of said pins play in arcuate slots 50 in the side walls 51 of a casing carried by the arm 6, said slots 50 being formed on arcs whose center is coincident with the fulcrum pin 48.

Enclosed within the walls 51 is a locking member 52 formed with a V-shaped groove 54 which fits over the cam lugs 23. The locking member 52 is provided with three vertical recesses 55 which are adapted to respectively embrace the inner projecting portions of the pins 28, according to the positions of said pins and thus lock said pins against lateral movement. A spiral spring 56 is located in the recess or chamber enclosed by the side walls 51, in which chamber the locking member 52 plays vertically, said spring acting when permitted to urge the locking member downwardly so as to cause engagement between one of the grooves 55 and the locking pins 28. The arcuate slots 50 formed in the walls 51 are herein shown as having therein leaf springs 58, each provided with three depressions, located substantially under the grooves 55 of the locking member. These springs support the inwardly projecting portions of the pins 28, and tend to center them relatively to the grooves 55. When the clutch pedal is pushed down the groove 54 in the locking member 52 engages the cam lugs 23 and arrests the movement of the locking member, continued movement of the clutch lever serving to compress the spring 56 and to move the pins 28 out of locking engagement with the grooves 55. The pins being thus unlocked are free to be moved laterally in the cross grooves 27 and into position to enter either of the grooves 25 or 26 in the plates 22. Such movement of either of the pins 28, from a neutral position where it is opposite the groove 24, to a position to enter either of the other grooves, results in effecting the selection of the desired gear to be shifted.

The top part of the pedal is connected through a ball and socket joint 59 with the rod 60 arranged in front of the arm 6, and connected through a second ball and socket joint 64 with an arm of the bell crank 46. This constitutes the connection between the pedal and the bell crank 46 on the left hand side, the pin 28 of such bell crank operating in the grooves of the left hand plate 22.

The pedal is connected at the center of its right hand edge through a ball and socket 61, with a second rod 62 whose opposite end is connected through a ball and socket 64$^a$ with an arm of the bell crank 46 at the right hand side. The pin 28 which is on another arm of this bell crank projects at its outer portion to enter the grooves of the right hand plate 22.

The rod 60 is suitably connected with a wire 65 which is encased in a flexible cable 66 and is attached to an indicator plate 67 pivoted at 68 back of an opening 69 in the instrument-board. This indicator plate is provided with a central slot 70 on either side of which are the words "High" and "Second." The other connecting rod 62 has similarly attached thereto a wire 71 which is connected to an indicator plate 72 pivoted on the shaft 68, and provided with a central slot 73 on opposite sides of which are located the words "Rev." and "Low." Back of the two plates 67, 72, on the shaft 68, is mounted a third plate 74 having, in alinement with the spaces 70, 73, of the first-mentioned plates, the word "Neut.", indicating the neutral position of the gears. The wires 65, 71, which are respectively connected with the rods 60 and 62, so control the positions of the indicator plates as to bring into view through the opening 69 the word indicating the result of the gear selection which was made through the pedal, as will be obvious. The arm 77 is operated by a downward movement of the clutch lever to cause disengagement between the parts 78, 79 of a cone or other clutch in a manner which is well understood.

From the foregoing description it is believed that the operation of the selecting and gear shifting mechanism will be apparent. When the parts occupy the positions as shown in Figure 1 the two outwardly extending ends of the pins 28 occupy the upper portions of the neutral slots 24 in the plates 22, and the several gears are as shown in Figure 10. Upon depression of the pedal the pins 28 will move down in the slots 24, throughout the downward stroke of the clutch lever, and at the limit of this downward movement the pins will occupy the cross slots 27. Selection of the gear to be first shifted is now made by rocking the pedal, either forwardly or backwardly, or laterally to the right or left. If the pedal is tilted forwardly, for example, rod 60 and attached bell crank 46 will move the pin 28 on the left hand side in a backward direction. When the pedal reached its extreme lower point the locking member 52 by engagement with the cam lug 23, released its locking engagement with the pins, hence the left hand pin 28 was free to be moved into the selecting position described. Upon release of the pedal, subsequent to the movement of the left hand pin 28 into alinement with the slot 25, the clutch lever will rise and movement of the pin in the curved portion of the slot 25 will cause the left hand plate 22 to advance, thereby imparting through the extension 30, rod 32, arm 33, shaft 34 and fork 35 movement of the gear 36 into mesh with the gear 37. This shifting occurs while the pin 28 is traveling in the curved portion of the slot 25, and during the continued travel of the pin in the straight portion 25$^a$ of the slot the clutch members will be permitted to engage. It will thus be apparent that during the upward travel of the clutch release lever it will be impossible for the clutch members to become engaged until the gear shifting operation has been completed. To change from the low to the next highest gear, it is simply necessary to again depress the pedal, whereby the clutch is first released, and the gear 37 is thereafter moved into neutral position. When the lever has moved sufficiently far to carry the locking member into engagement with the cam lug 23, the pin 28 will then be freed for another selective movement. This may be effected by the operator's foot rocking the pedal reversely to move the pin 28 into the forward end of the cross slot 27. The pedal will then be released, and the clutch lever in rising will cause the pin 28 to travel in the curved portion of the slot 26, thus shifting the gear 36 into mesh with the gear 38 for reverse. If the operator only shifted his foot sufficiently far to move the pin 28 in line with the opening leading to the neutral slot 24 and then released the pedal, no gears would be shifted and the locking member 52 would lock the pins 28 and maintain them in locked position as they passed upwardly in the grooves 24, until the parts assumed the neutral position as shown in Figure 1.

The selection of the gear to be shifted for "second," or "high" is accomplished by rocking the pedal to the right or to the left, whereby the connecting rod 62 which controls the position of the pin 28 operating in the slots of the right hand plate 22, and which may be so positioned as to enter any of the slots in said plate as desired, to effect the shifting of appropriate gear for "high," "second," or into neutral position, and thereafter the engagement of the clutch parts by which power is applied through the selected gears to drive the vehicle, if the gears are shifted into high or second position.

It will be observed that the axes of the ball and socket joints 59 and 61 connecting the pedal with the rods 60, 62, are in line with the pivots 12 and 10, and the two forked connections between the pedal and the arm 6 are so constructed that when the pedal is rocked on one axis, as the axis 12, it is locked against movement on the other axis, 10, and only the gears which are subsequently shifted in accordance with the selection made by the rocking of the pedal on either of said axes, may be selected, and without the actuation of the selecting devices for the gears whose shifting movements are pre-selected through rocking movement of the pedal on the other axis.

It will also be observed that the construction of the grooved plates 22 is such as to insure a delay in the gear shifting operation until the clutch has been fully disengaged, and to also prevent the re-engagement of the clutch parts until the gear shifting operation has been completed.

Having thus described my invention what I desire to secure by Letters Patent of the United States is:

1. In a gear shift control a clutch, a clutch operating lever, a pedal mounted to turn upon two intersecting axes on said lever, and independent connections from said pedal to gear selecting mechanism, one of said connections being operable when the pedal is rocked about one axis and the other connection being operable when the pedal is rocked about the other axis.

2. A gear shift control having in combination a clutch, a clutch operating lever, a pedal mounted upon said lever to turn on axes at right angles to each other, independent cam plates having connections with gears to be shifted, and devices having connection with said pedal, and separately operable upon the rocking of the pedal on said axes respectively for controlling through said cam plates the selection of the gear to be shifted.

3. In a gear shift control, the combination with a clutch, of a clutch operating lever, a pedal mounted thereon so as to turn about two intersecting axes, plates having cam grooves therein and connected with separate gears to be shifted, devices for entering the grooves in said plates to cause appropriate movements thereof for shifting the gears, and means separately connected with said pedal and arranged to be selectively positioned upon the rocking of the pedal on its different axes to determine the position of said devices with respect to the grooves in said plates, whereby the desired gear may be selected by the proper tilting of the pedal.

4. In a gear shift controlling device the combination with a clutch, of a clutch controlling lever, a pedal having two pivotal connections with said lever arranged to permit turning of the pedal upon intersecting axes, a shaft, two plates pivotally mounted on said shaft, said plates each having a neutral groove and two cam grooves therein, said cam grooves being in part curved and in part straight, cams on said plates, pins each mounted for movement so as to enter selectively any of the slots of said plates, independent connections between said pedal and said pins, and a lock carried by said lever and constructed to hold said pins in locked position while said pins are traversing said slots, said lock arranged to engage said cams in the lower position of said lever and movable out of engagement with said pins to permit said pins to be moved into position to enter the desired slots in said plates.

5. In a gear shifting control the combination of a clutch, shifting gears, a clutch controlling lever, a pedal mounted to turn about intersecting axes on said lever, grooved cam plates independently connected with the gears to be shifted, means for pivotally supporting said plates, selecting devices carried by said lever, connections between said devices and said pedal, said connections being spaced about 90 degrees apart on said pedal, and a lock carried by said lever having means for engaging said selecting devices to hold them immovable when said lever is elevated, means carried by said cam plates for releasing said lock from the selecting devices when said lever is fully depressed, thereby permitting movement of said devices to select the gear to be shifted only while said lever is in its depressed position.

6. In a gear shift control the combination of a clutch, a clutch controlling lever, differential sliding gears, a pedal mounted on said lever to rock about two intersecting axes, means to prevent said pedal from being rocked upon more than one of said axes at a time, gear shift selecting devices, independent connections between said devices and said pedal, said connections being spaced about 90 degrees apart where they meet said pedal, and means to effect the shifting of the appropriate gear in accordance with the selection made by rocking said pedal, said means being operable through devices which act during the return movement of the pedal from fully depressed position.

7. In a gear shift control a clutch, shifting differential gears, a clutch control lever, a pedal mounted for pivotal movement about intersecting axes on said lever, means actuated by said lever as it moves away from fully depressed position to effect the shifting of said gears, and means to select the gear to be shifted controlled by rocking said pedal in the desired direction.

In testimony whereof I have hereunto set my hand this 10th day of July, A. D. 1926.

ROBERT N. DULANEY.